April 23, 1929.  B. R. BRESLER  1,710,289
VALVE OPERATING MECHANISM
Filed Aug. 11, 1928
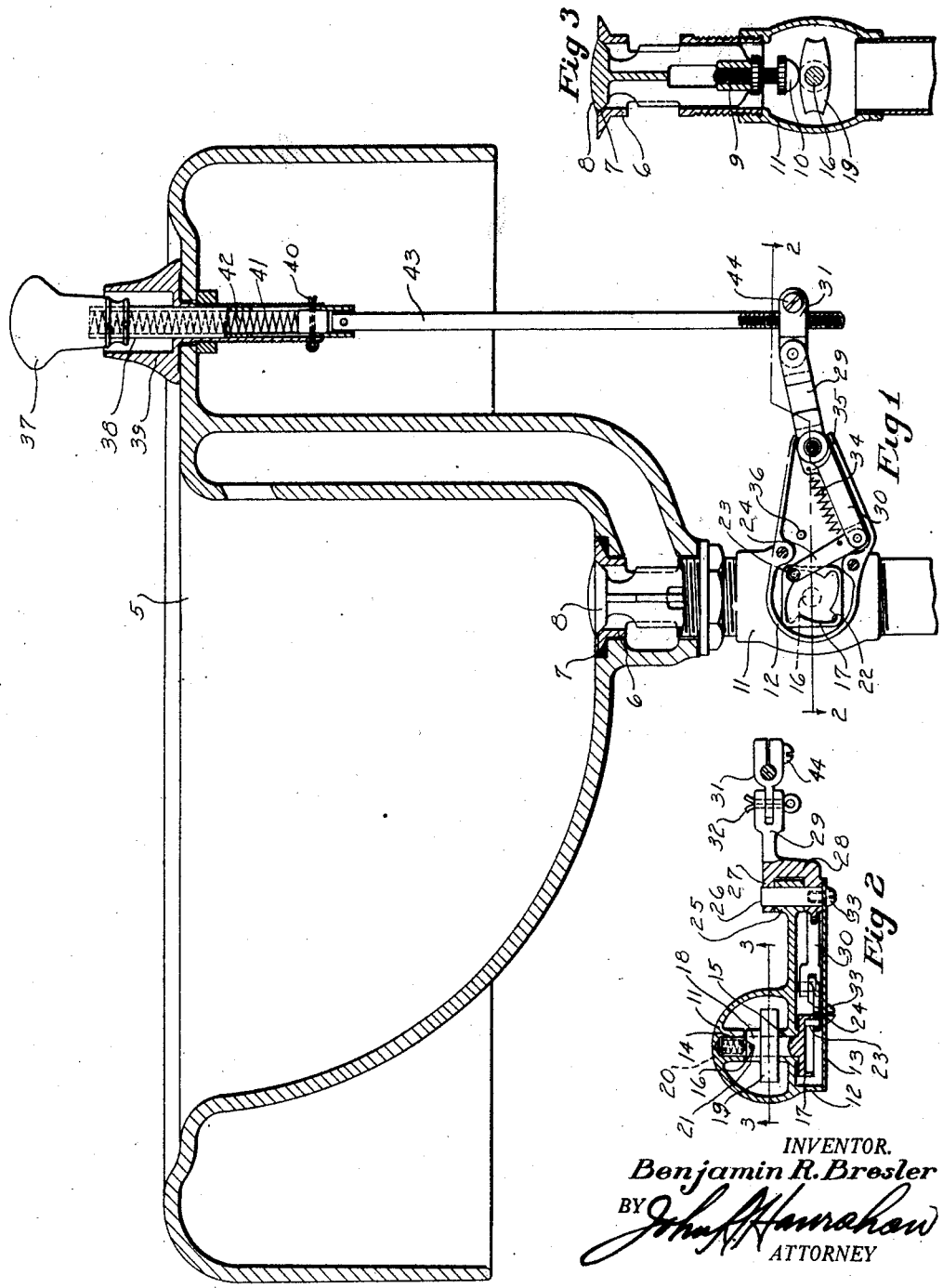
INVENTOR.
Benjamin R. Bresler
BY John J. Hanrahan
ATTORNEY Patented Apr. 23, 1929.

1,710,289

UNITED STATES PATENT OFFICE.

BENJAMIN R. BRESLER, OF BRIDGEPORT, CONNECTICUT.

VALVE-OPERATING MECHANISM.

Application filed August 11, 1928. Serial No. 298,907.

My present invention relates to new and useful improvements in valve operating mechanism.

An object of the invention is to provide a mechanism for operating a valve, as for example, the waste valve of a bath-room fixture, which mechanism opens and closes the valve on repeated pushing of a hand piece and comprises but a few simple parts which may be cheaply and easily constructed, assembled and operated.

A further object is to provide a valve operating means which at the time of manufacture may be assembled into two units ready for application, one of said units being adapted to be fitted into the pipe line in association with the valve to be operated, and the other of said units including an operating or hand piece.

An additional object is to provide a valve operating mechanism including a unit adapted to be interposed in a pipe line and form a part thereof, the unit including means for operating on the valve and also including means for preventing leakage around the operating means.

Another object is to provide means for the purpose set forth, said means including a link means adapted to be straightened in one plane upon depression of a hand piece in a second plane and said link means cooperating with other means to operate a cam to open or close a valve.

An additional object is to provide a valve operating means including a ratchet and a movable arm and link pivoted thereto and adapted to move the ratchet on movement of the arm, spring means being provided for returning the parts to normal position and stop means being provided for causing said link to move about its pivot after a predetermined movement of the arm.

With the foregoing and other objects in view as will become more apparent as the description proceeds, the invention consists in certain novel features of construction, combination and arrangement of parts as will be hereinafter more fully described and particularly pointed out in the appended claims.

In the accompanying drawing:—

Fig. 1 is a vertical sectional view through a basin showing the hand piece of my valve operating mechanism in section, and the cover plate for the link mechanism being removed;

Fig. 2 is a sectional view on the line 2—2 of Fig. 1; and

Fig. 3 is a sectional view on the line 3—3 of Fig. 2.

Referring in detail to the drawing, 5 indicates a wash basin or the like having an outlet in which is arranged the valve cage 6 including a seat 7 for a valve 8. To the lower end of the valve is secured an adjustable means preferably in the form of a screw 9 having a spherical head 10 against which contact may be made to open the valve.

Disposed in the pipe line leading from the outlet of the basin, is a coupling or nipple 11 forming part of one of the two units which comprise my improved valve operating mechanism. Preferably cast integral with the coupling 11 is a housing 12 in which is assembled part of the operating mechanism; a cover plate 13 being provided for closing the housing.

Within the coupling 11 there are formed aligned bearings 14 and 15 in which is rotatably mounted a pin or stud 16 integral with a ratchet 17. As shown, this stud fits snugly but freely in the bearings and disposed on the stud in the space between the bearings is a sleeve 18 carrying a valve operating cam 19.

Arranged within the end of the stud 16 is a coil spring 20, the tendency of which is to maintain the cam 19 in engagement with the end of bearing 15 and thereby prevent the escape of water through the bearing. While the cam is shown as secured by means of a pin 21 any other suitable means may be employed.

From the foregoing it will be seen that the ratchet 17 and cam 19 are so constructed and assembled as to operate as a unit. The cam is disposed below the valve and the head 10 of screw 9 is so positioned as to be engaged and elevated to open the valve when the cam is partially rotated. There are two long arms on the cam and when either of these is under the head 10, the valve is open.

As best shown in Fig. 1, 17 is an internal ratchet and is provided with four depressions 22 into which a pin 23 carried by a link 24 successively engages as the ratchet is rotated in a step-by-step turning movement. The outer end of housing 12 includes a cylindrical portion 25 in which is secured a stud shaft 26 on each end of which is journaled the arms 27 of the bifurcated intermediate portion 28 of a rockable member 29. This double bearing insures the smooth working and proper aligning of parts.

Integral with one of the arms 27 is an extension 30, the forward or free end of which is pivotally secured to one end of the link 24. At its rear end the member 29 is secured to a split nut 31 as by means of a cotter key or the like 32. The cover plate 13 is secured to the housing 12 by means of screws 33, one of which (see Fig. 2) enters the tapped end of the stud shaft 26.

On the nut 31 being depressed, the member 29 is rocked about the shaft 26 resulting in the extension 30 moving upwardly. Link 24 being pivoted at one end to the extension moves upwardly with it, pin 23 remaining in a depression 22 in which it is held by means of a coil spring 34 connected at its respective ends to the link and to a lug 35 on the member 29. As the extension 30 moves upwardly, link 24 engages a stop pin 36 and further movement of the extension results in movement of the link about its pivot and against the action of spring 34.

This straightening out of the link and extension results in the ratchet 17 being given a quarter turn and imparting a similar movement to the cam 19. The manner in which the parts are returned to their normal position ready for the next operation will later be described.

The means for operating the parts in the manner just described includes a button or hand piece 37 secured to a tubular piece 38 arranged within a bearing or mounting 39. Piece 38 is secured to sleeve 39 by means of a pin 40 passing through the sleeve and through a pair of aligned slots 41 in the piece. This arrangement allows of relative vertical movement between these parts.

A coil spring 42 is arranged within the piece 38 and normally maintains the button 37 in its "up" position as shown. For the purpose of transmitting motion from the button 37 and piece 38 to the split nut 31, a rod 43 is pinned to the lower end of the piece and threaded through the nut. A lock screw 44 secures the position of the rod 43 relative to nut 31.

Owing to the threaded connection just described, vertical adjustment may be had to adapt the mechanism for different locations and to different wash basins, bathtubs and the like. Further, horizontal adjustment may be had at the connection between the member 29 and nut 31 or either or both of these parts may be made in different lengths.

It will now be clear that my improved valve operating mechanism comprises two units, one being the hand piece or button and its associated parts and the other comprising the coupling 11, and housing 12, and parts assembled therein. Further, it will be understood that when the hand piece is depressed and the cam rotated a quarter turn, the springs 34 and 42 function to return the operating parts to normal positions. On one movement the cam raises the valve to open it and on the next movement of the cam, the valve is permitted to descend by gravity, since the cam is moved from under it.

While I have shown and described one specific embodiment of my invention, it is to be understood that this is for the purpose of making clear its construction and operation, and that such disclosure is not to be considered as limiting the invention for a definition of which reference should be had to the annexed claims.

Having thus described my invention, what I claim is:—

1. A unit of a valve operating mechanism, said unit including a coupling adapted to be interposed in a pipe line below a valve, a pair of bearings within said coupling, a shaft mounted in said bearings and extending through one of them, a cam on said shaft between said bearings, and means maintaining said cam in contact with one end of that bearing through which the shaft extends, whereby to prevent leakage through said bearing.

2. A valve operating mechanism including a unit comprising a coupling and a housing, a cam within said coupling, a ratchet in said housing, means coupling said cam and ratchet whereby they turn as a unit, means within said housing for giving said ratchet a step-by-step turning movement, and other means arranged exterior of the housing and adapted to be reciprocated to operate said means within the housing.

3. A device as in claim 2, the said means within the housing including an arm and a link pivotally connected together, one of said members including means to engage and move the ratchet.

4. A device as in claim 2, the said means within the housing including an arm and a link pivotally connected together, one of said members including means to engage and move the ratchet, and a spring connected to one of the members and resisting said movement and serving to return the parts to normal position after movement of the ratchet.

5. A device as in claim 2, the said means within the housing including an arm and a link pivotally connected together, said link including means to engage and move the ratchet, said arm extending outwardly of said housing and pivoted intermediate its ends, and connected with the means arranged exterior of the housing.

6. A unit of a valve operating mechanism, the same comprising a coupling adapted to be interposed in a pipe line, a housing formed with said coupling, a bearing at one end of said housing, a cam within said coupling, a ratchet within said housing, means connecting said cam and ratchet whereby they move as a unit, an arm having pivotal mounting at said bearing and extending into said housing, a link pivoted to the end of the arm within the housing and adapted when the arm is operated to rotate the ratchet, and means exterior of the housing for operating on said arm.

7. In combination, a valve, a hand piece, and means disposed between said valve and hand piece and adapted on manipulation of the hand piece to open the valve, said means including a link, a lever pivotally connected to said link, said link and lever adapted to straighten relatively each time the hand piece is operated, and a spring for returning the link and lever to their normal positions when the hand piece is released.

8. In combination, a valve, a hand piece, a means disposed between said valve and hand piece and adapted on being manipulated to open the valve, said means including a rotary cam arranged to engage the valve, a ratchet mounted to turn with the cam, a link and a lever pivotally connected and normally angularly arranged, said link normally engaging a tooth of the ratchet, and said link and lever adapted to straighten relatively and then fold on manipulation of the hand piece, said link acting to impart a rotary motion to the ratchet during the straightening movement of the link, whereby to rotate the cam and open the valve.

Signed at Bridgeport, in the county of Fairfield, and State of Connecticut, this 8 day of August, A. D. 1928.

BENJAMIN R. BRESLER.